United States Patent [19]

Katz et al.

[11] Patent Number: 4,556,575

[45] Date of Patent: Dec. 3, 1985

[54] METHOD FOR AROMATIZING SOLUBLE COFFEE

[75] Inventors: Saul N. Katz, Monsey, N.Y.; Donald T. Kearney, Bayonne, N.J.

[73] Assignee: General Foods Corporation, White Plains, N.Y.

[21] Appl. No.: 636,207

[22] Filed: Jul. 31, 1984

Related U.S. Application Data

[63] Continuation-in-part of Ser. No. 481,005, Mar. 31, 1983, abandoned.

[51] Int. Cl.$^4$ .............................................. A23F 5/00
[52] U.S. Cl. ..................................... 426/594; 426/386
[58] Field of Search ............... 426/594, 386, 478, 388, 426/384, 385

[56] References Cited

U.S. PATENT DOCUMENTS

| | | | |
|---|---|---|---|
| 3,021,218 | 2/1962 | Clinton et al. | 426/384 |
| 3,535,118 | 10/1970 | Klein et al. | 426/386 |
| 3,939,291 | 2/1976 | Katz | 426/388 |
| 3,979,528 | 9/1976 | Mahlmann | 426/386 |
| 4,007,291 | 2/1977 | Siedlecki et al. | 426/594 |
| 4,119,736 | 10/1978 | Howland et al. | 426/386 |

*Primary Examiner*—Raymond Jones
*Assistant Examiner*—Marianne M. Cintins
*Attorney, Agent, or Firm*—Basam E. Nabulsi; Joseph T. Harcarik; Daniel J. Donovan

[57] ABSTRACT

An improved method for aromatizing soluble coffee is described which results in a higher fixation of grinder gas aromas on a glyceride substrate and an improved quality jar aroma. The method involves liquid-liquid contact of the water phase, normally drained from equilibrated grinder gas and discarded, with a glyceride to recover valuable coffee aromatics in the glyceride. Further, reflux of liquid carbon dioxide is used to recover yet more valuable coffee aromatics in the glyceride. A 25 to 70% increase in aromatic yield is realized with an improvement to the aromatic quality of the aromatized glyceride and thereby the aromatized soluble coffee.

14 Claims, No Drawings

METHOD FOR AROMATIZING SOLUBLE COFFEE

This is a continuation-in-part of our prior application Ser. No. 481,005 filed Mar. 31, 1983, now abandoned.

TECHNICAL FIELD

This invention relates to a method for aromatizing soluble coffee and more particularly to a method for producing an improved aromatized glyceride for use in the aromatization of soluble coffee.

BACKGROUND ART

Grinder gas, that is the gas which is released from roasted whole coffee beans when their internal cell structure is disrupted, such as during grinding of the beans and which also continues to be evolved from the disrupted and/or fractured beans for a short period thereafter, has long been recognized in the art as a highly desirable natural coffee aroma. A great deal of effort has been directed toward the development of a method for recovering and fixing a high percentage of grinder gas aromas on a substrate for subsequent addition to coffee products, particularly soluble coffee powder.

Clinton et al. in U.S. Pat. No. 3,021,218 disclose a method whereby a coffee aroma condensate is vaporized to admit the more volatile coffee aromas into void spaces of a container filled with soluble coffee. Johnston teaches addition of condensed grinder gas to chilled soluble coffee powder in U.S. Pat. No. 2,306,061. These two methods are similar in that grinder gas aromas are contacted directly with coffee particles in order to improve the aromatics of the coffee product. However, both methods fail to provide the convenience, stability, and high level of grinder gas fixation, desired in the coffee field.

Several methods for fixing grinder gas aromatics in a glyceride substrate are known in the art, such glycerides as coffee oil, bland-tasting vegetable oils, and triacetin being especially useful for this purpose. Katz in U.S. Pat. No. 3,939,291 teaches contacting condensed grinder gas and a glyceride in a pressure vessel at a temperature above the critical temperature of liquid carbon dioxide, then slowly venting the vessel while maintaining the temperature above carbon dioxide's critical temperature. Katz' method effectively prevents the formation of liquid carbon dioxide at any point during the glyceride aromatization procedure. Mahlmann discloses, in U.S. Pat. No. 3,979,528, contacting a glyceride and condensed grinder gas in a pressure vessel at a temperature of 70° to 75° F. and a pressure above 100 psia to enable aromatic transfer from the liquid carbon dioxide phase to the liquid glyceride phase, and then venting the vessel. Mahlmann's procedure involves repeated venting of said pressure vessel from a high pressure ranging from 75 to 120 psig, to a low pressure of 0 psig. Siedlecki et al. in U.S. Pat. No. 4,007,291 teach a procedure whereby a glyceride is contacted with condensed grinder gas in a pressure vessel at a temperature of 70° to 85° F. and a pressure in excess of 700 psig, then slowly venting the pressure vessel, preferably isothermally. Howland et al. in U.S. Pat. No. 4,119,736 disclose removal of a water phase from a pressure vessel containing condensed grinder gas at a pressure of in excess of 506.2 psia and a temperature of greater than 32° F., contacting the demoisturized grinder gas with a glyceride, and slowly venting the pressure vessel. Howland et al. disclose that it is possible to separate aromas from the removed water phase, such as by vacuum distillation, and to reclaim or recycle vented aromatics.

It is an object of the present invention to produce an aromatized glyceride of improved quality which may be used to aromatize soluble coffee.

It is a further object of the invention to improve the organoleptic character of an aromatized glyceride such that it is more like freshly roasted and ground coffee grinder gas.

It is an additional object that the aromatized glyceride exhibit good stability both prior to and subsequent to its application to a coffee substrate.

It is yet another object that the process by which an aromatized glyceride is produced satisfying the above criteria, be controllable, reproducible, safe and efficient.

SUMMARY OF THE INVENTION

It has been found according to the present invention that a vastly improved method for aromatizing soluble coffee powder with a glyceride, aromatized by contact with a grinder gas frost, is attained by a process comprising the steps of:

(a) condensing, as a frost, grinder gas which has a high carbon dioxide content;

(b) placing the grinder gas frost in a pressure vessel;

(c) supplying heat to the contents of the vessel and allowing the frost to equilibrate at a pressure in excess of 506.2 psia and at a temperature of greater than 32° F., to form three phases: (1) gaseous carbon dioxide plus aromatics, (2) liquid carbon dioxide plus aromatics, and (3) liquid water containing aromatics;

(d) draining the water phase which contains aromatics from the vessel;

(e) contacting a glyceride with the water phase of step (d) to transfer aromatics from said water phase to the glyceride;

(f) introducing the glyceride, which contains aromatics transferred from the water phase, into the pressure vessel of step (b);

(g) supplying heat to the contents of the pressure vessel if necessary in order to raise the temperature to between 70° to 85° F., and thereby increase the pressure to about 750 to 850 psia, to form three phases: (1) gaseous carbon dioxide plus aromatics, (2) liquid carbon dioxide plus aromatics, and (3) liquid glyceride which contains water phase aromatics;

(h) refluxing, in a packed column, liquid carbon dioxide and gaseous carbon dioxide phases, while slowly venting, thereby removing "lean" carbon dioxide from the vessel and concentrating aromatics in the glyceride, until the pressure drops to about 650 to 700 psia;

(i) depressurizing the vessel;

(j) obtaining an aromatized glyceride; and (k) combining the aromatized glyceride with soluble coffee powder.

The method for aromatizing soluble coffee described above represents at least a two-fold improvement over the prior art. First, the aromatic transfer from water phase to glyceride of step (e) and the reflux system of step (h) result in about a 25 to 70% increase in the quantity of coffee aromatics transferred to the glyceride, as measured by gas chromatography, over the glyceride aromatization systems described in the art, specifically Siedlecki et al. and Howland et al. Said 25 to 70% increase in aromatic recovery translates to a significant increase in the aromatized glyceride yield from a given amount of grinder gas frost, thus greatly improving the efficiency of a grinder gas aromatization system and the economies thereof.

Second, the quality of the aromatized glyceride and thereby the aromatized soluble coffee powder produced by the present invention is largely improved over previous aromatization systems. The aromatized soluble coffee powder of the present invention, when compared to prior art coffee aromatization processes at an equivalent quantitative aroma level, as measured by gas chromatography, is found to impart a superior coffee aroma, with a more "groundsy", "roasted and ground", "high impact" coffee aroma character. The improved qualitative coffee aroma character of the present invention is directly attributable to the aroma balance of the aromatized glyceride which results from (1) recovering the aromatics from the water phase in step (e), and (2) concentration of the coffee aromatics through reflux in step (h).

DETAILED DESCRIPTION OF THE INVENTION

The present invention is directed to combining with coffee solids an aromatized glyceride cotaining grinder gas aromatics which have been concentrated and condensed from a grinder gas frost. This invention is particularly described in terms of coffee grinder gas, which contains 80% to 90% by weight carbon dioxide; however, it is to be understood that other aroma-bearing gases which have a high carbon dioxide content such as coffee percolator vent gas and coffee roaster gas, may likewise be employed and are considered to be within the scope of this invention.

The most readily available source of grinder gas may be obtained by enclosing or hooding coffee grinding equipment, such as commercial grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed, it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture quenches or quenching mediums. The evolved gas is preferably passed through a first condenser where it is cooled to between 35° and 50° F. and where substantial quantities of water are removed. The removed water, typically termed "knockout water", may be subsequently contacted with a glyceride, as described below, to recover any coffee aromatics contained therein. The relatively low-moisture gas is then fed to a condenser, such as a jacketed, vertically-mounted, scraped-wall heat exchanger, which is cooled by means of a liquid gas refrigerant.

Preferably the condenser is cooled by means of liquid nitrogen and the gas flow into the exchanger is maintained within the range of about 1 to 5 cubic feet per minute per square foot of heat exchanger surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. Typical grinder gas frost is collected at a liquid nitrogen jacket temperature of $-195°$ F. to $-225°$ F. contains approximately 87% carbon dioxide, approximately 10% water, and approximately 3% coffee aromas. The frost is removed from the condenser wall and collected for combination with a glyceride carrier. The frost may be held for a short period at low, such as liquid nitrogen, temperatures without deteriorating; however, it is preferred to immediately utilize the frost in accordance with this invention.

According to this invention, the grinder gas frost is placed in a pressure vessel. A sufficient amount of the grinder gas frost is added to avoid the presence of an unsaturated carbon dioxide vapor phase. Heat is added to the contents of the vessel, such as by means of a 70° to 85° F. water jacket, to sublime the grinder gas frost and form a headspace pressure. At approximately 75 p.s.i.a. solid carbon dioxide changes to liquid. The temperature corresponding to this phase change is $-70°$ F. At this condition, water and any trace glyceride present, as well as some of the organic aromatics, are in the solid state. The temperature of the vessel contents is raised preferably to about room temperature, at which condition the grinder gas aromatics will diffuse and establish an equilibrium among the gaseous carbon dioxide, liquid carbon dioxide, and water phases. Temperatures in excess of about 85° F. should be avoided as degradation of the coffee aromatics may result. After the frost within the vessel has reached the desired temperature, and possibly after an equilibrium period of up to several hours, a peak pressure is reached.

The vessel contents at this peak pressure may be in three distinct phases including a bottom water phase, a liquid carbon dioxide phase, and a gaseous carbon dioxide phase with aroma present in each phase. After the pressure within the vessel has reached its peak, generally at about 750 psia to about 950 psia, the water phase is removed from the vessel. This can be done by simply draining the water through a valve in the bottom of the vessel.

The removed water phase is contacted with a glyceride, preferably coffee oil, in any apparatus that provides efficient liquid-liquid contact. Optionally, the knockout water previously recovered may be incorporated herein. An agitated batch tank or a continuous apparatus such as a rotating disc or reciprocating plate column may be employed to contact the water phase with the glyceride. In a preferred embodiment of the invention, coffee oil is atomized into a batch tank containing the water phase, and the mixture is agitated mechanically with an impeller to ensure sufficient liquid-liquid contact.

Effective partioning of grinder gas aromatics from the water phase to the glyceride, preferably coffee oil, is achieved by contacting the water phase with the glyceride at a volume ratio of about 0.5:1 to about 4:1, and preferably about 1:1 to 1.5:1, water to glyceride. Said contact is generally conducted at a temperature of about 35° F. (1.7° C.) to about 120° F. (48.9° C.), typically at a temperature of about 50° F. (10.0° C.) to about 100° F. (37.8° C.), and preferably at about ambient temperature. The transfer of coffee aromas to the glyceride is primarily by diffusion and the rate thereof is generally improved at higher temperatures. However, it is essential to the present invention that degradation of the coffee aromas contained in the removed water phase be prevented, and therefore that temperature in excess of 120° F., and preferably 85° F., be avoided during the liquid-liquid contact.

The contact time necessary for effective partitioning of the coffee aromas from the water phase to the glyceride is primarily dependent upon the contact temperature, contact ratio of water to glyceride, type of liquid-liquid contact apparatus employed, and degree of agitation supplied. However, in order to partition the coffee aromas which have been found by the present invention to be necessary to deliver a "groundsy" aroma character to the final aromatized soluble coffee, it has been found that a certain minimum contact time is required. For example, in one embodiment of the present invention wherein a water phase containing grinder gas coffee aromas was contacted with coffee oil at a volume ratio of 1:1, in an agitated batch reactor at a temperature of 75° F., it was found that a minimum contact time of 8 minutes, and preferably at least 15 minutes, was needed to transfer sufficient grinder gas aromas to the coffee oil to achieve the desired "groundsy" aroma character in the aromatized soluble coffee powder. Generally, minimum contact times in excess of four minutes and effective to transfer sufficient aromatics from the water phase to the glyceride to deliver a groundsy coffee aroma are required in batch reactors. Shorter contact times, as low as about 30 seconds, can be effective to transfer said groundsy coffee aromas to the glyceride in continuous reactors. Minimum contact times may vary as a function of the processing conditions such as contact temperature, contact ratio, etc., employed, but such variations are seen to fall within the scope of the present invention.

The glyceride phase which now contains partitioned grinder gas coffee aromas from the water phase is separated therefrom by any suitable liquid-liquid separation technique, typically by centrifugation. The separated water phase may contain trace amount of desirable grinder gas coffee aromas which may be recovered by recycling said water phase into a second liquid-liquid contact with a glyceride, either alone or in combination with an additional grinder gas coffee aroma-containing water phase.

The separated glyceride phase contains grinder gas coffee aromas which are discarded in existing prior art systems. Said glyceride is added to the pressure vessel from whence the water phase was previously removed, said addition generally being via a high pressure pump. The pressure vessel contains a gaseous carbon dioxide plus aromatics phase and a liquid carbon dioxide plus aromatics phase and is typically at a pressure of about 750 psia to about 950 psia. The high pressure pump must supply a pressure in excess of the vessel pressure, typically by at least 50 psia, preferably by at least 100 psia, and most preferably by at least 200 psia, in order to supply the glyceride to the pressure vessel.

The pressure vessel is maintained at a temperature of about 75° F. (23.9° C.) to about 85° F. (29.4° C.) and thereby a pressure of about 750 psia to about 950 psia, for a sufficient period to allow the establishment of vapor-liquid equilibrium. At equilibrium there exists in the pressure vessel three phases, each containing a percentage of grinder gas coffee aromatics, the phases being (1) a gaseous carbon dioxide phase, (2) a liquid carbon dioxide phase, and (3) a liquid glyceride phae. Equilibrium is generally established when the pressure in the pressure vessel stabilizes.

Above the pressure vessel is mounted a packed column and a partial or total condenser. The packed column is generally loaded with any packing which is suitable for vapor-liquid mass transfer and which resists corrosion and does not catalyze unwated thermal degradation reactions (e.g., nickel-plated packing). After the pressure vessel has reached equilibrium, it is allowed to vent into the packed column and the partial or total condenser, which are sealed from the atmosphere. In the case of a partial condenser, a cooling fluid is passed through the condenser, generally at a temperature of about 35° F. (1.7° C.) to about 70° F. (21.1° C.), and typically at about 45° F. (7.2° C.) to about 60° F. (15.6° C.), thereby condensing a portion of the gaseous carbon dioxide phase containing aromatics to the liquid phase. In the case of a total condenser, a cooling fluid passes through the condenser at temperatures comparable to the partial condenser case, but the system is operated so as to condense the entire gaseous carbon dioxide stream passing therethrough. In this way, a better condensation of coffee aromas is effected and thus a higher degree of coffee aroma recovery is enabled. In either case, the liquid phase returns through the packed column to the pressure vessel as reflux, becoming enriched with aromatics from the rising gaseous phase through mass transfer.

After liquid carbon dioxide begins to reflux through the condenser, the condenser is slowly vented to the atmosphere to allow removal of gaseous carbon dioxide in the case of a partial condenser and liquid carbon dioxide in the case of a total condenser from the pressure vessel system. The carbon dioxide which is vented is "lean" in aromatics because the majority of aromatics are transferred to the refluxing liquid carbon dioxide in the packed column according to the invention. The pressure vessel system is slowly vented from its equilibrium pressure, generally about 750 psia to about 950 psia and typically about 850 psia to about 900 psia, and at a temperature of about 75° F. (23.9° C.) to about 85° F. (29.4° C.), until the pressure drops to between about 650 psia to about 700 psia. The system is vented slowly, generally over a period of several hours and typically for about 3 to 4 hours. It is essential to the invention that the gaseous carbon dioxide not be vented from the pressure vessel system too rapidly while the pressure is being reduced to between about 650 psia to 700 psia, because too rapid a vent result in insufficient aromatic mass transfer from the gaeous carbon dioxide phase to the liquid carbon dioxide phase in the packed column. This, in turn, has been found to result in an aromatized glyceride of inferior quality. In a preferred embodiment of the invention, "lean" gaseous carbon dioxide is vented through small diameter capillary tubing to enable reliable control of the vent rate.

After the pressure in the pressure vessel has dropped to about 650 psia to 700 psia, the reflux of liquid carbon dioxide is ceased according to the invention. The pressure vessel is thereafter vented to atmospheric pressure and the aromatized glyceride is removed from the pressure vessel. Said aromatized glyceride is typically filtered, standardized by blending with a quantity of unaromatized glyceride, and stored in cans for subsequent use on a soluble coffee packing line.

Gas chromatographic (GC) analysis of the aromatized glyceride produced by the invention prior to standardization demonstrates a large increase in aromatic intensity and an improvement in aromatic quality over prior art methods. GC is an analytic technique routinely used to measure the quantity of coffee aromas present in a particular sample. Total GC counts measure the total aromatic content of a sample whereas individual GC "peaks" on a GC printout measure amounts of individual compounds in a sample. Comparison of GC peaks is often used to compare the quality of one sample to another. It has been found that the present invention yields an aromatized glyceride with about 6.0 to $7.5 \times 10^6$ total GC count whereas prior art methods do not exceed about 4.5 to $5.0 \times 10^6$ total GC counts, when compared by controlled experimentation. Further, the quality of the aromatized glyceride, as reflected by individual GC peaks, is improved by the present invention over prior art methods. Said quality improvement has been proven by expert organoleptic comparison of standardized control and improved (method of present invention) aromatized soluble coffee samples, and by extensive consumer test comparisons thereof.

Standardization of aromatized glycerides is by GC, thereby producing glycerides with equivalent total quantities of coffee aroma compounds. However, the quality of aromatized glycerides produced by the present invention and prior art methods remains very different because the balance of coffee aromatics in the standardized glycerides as measured by individual GC peaks remains quite different. The present invention recovers and fixes the coffee aromatics of grinder gas in a glyceride such that the resulting aromatized soluble coffee exudes an improved coffee aroma, described as "high impact", "groundsy", and "roast and ground" by panels of experts. It is further noted that the product of the present invention lacks the pungent, sulfury character associated with prior art methods due to the balanced character of the aromatized glyceride.

EXAMPLE 1

Grinder gas collected from roast and ground coffee grinders was condensed in a battery of liquid nitrogen jacketed, scraped-surface heat exchangers. The knockout water was discarded. The condensed grinder gas frost was loaded into a pressure vessel with an internal volume of about $8\frac{1}{2}$ ft$^3$ and allowed to reach vapor-liquid equilibrium. A peak equilibrium pressure of 900 psig was attained at 85° F. The liquid water phase was drained from the bottom of the pressure vessel through a drain valve, which was thereafter immediately closed to maintain the liquid and gaseous carbon dioxide at equilibrium within the pressure vessel. The liquid water phase was placed in a batch tank, wherein coffee oil was added at a volume ratio of 1:1. The liquid water and coffee oil were contacted with agitation at ambient temperature for 15 minutes. The oil was then separated from the water by centrifugation and injected back into the pressure vessel by a high pressure pump at a pressure of 1050 psig.

The pressure vessel was then vented into a packed column and a partial condenser, said partial condenser cooled to 60° F. by recirculating water. Gaseous carbon dioxide containing coffee aromatics was condensed in the partial condenser, and passed back down through the packed column to the pressure vessel. Said return of the condensed liquid through the packed column was observed through a site glass and once a steady stream of returning liquid was observed, the partial condenser was allowed to vent slowly through capillary tubing to the atmosphere at a rate of 3500 cc/min. The pressure vessel was maintained at 80° F. throughout the controlled venting and simultaneous refluxing period. Venting at the 3500 cc/min rate was maintained until the pressure in the pressure vessel dropped to 680 psig, at which time the recirculating water supply to the partial condenser was ceased and the partial condenser vent rate was increased by ten-fold.

After the pressure vessel reached atmospheric pressure, the aromatized glyceride was removed therefrom and filtered. Analysis by gas chromatography (GC) demonstrated $7.5 \times 10^6$ total GC counts. The aromatized coffee oil was then blended with unaromatized coffee oil until a total GC level of $3.2 \times 10^6$ counts was obtained. This standardized coffee oil was spray-plated on soluble coffee powder at a level of 0.10% by weight, which was then packed in standard coffee jars. Expert evaluations termed the aromatized coffee powder so produced to be of an improved quality, having a "high impact", "groundsy", "roast and ground" jar aroma. It was found that this improved jar aroma was maintained over extended storage as well.

What is claimed is:

1. A method for producing an aromatized soluble coffee product comprising the steps of:
   (a) condensing, as a frost, coffee grinder gas;
   (b) placing the grinder gas frost in a pressure vessel;
   (c) supplying heat to the contents of the vessel and allowing the frost to equilibrate at a pressure in excess of 506.2 psia and at a temperature of greater than 32° F., to form three phases: (1) gaseous carbon dioxide plus aromatics, (2) liquid carbon dioxide plus aromatics, and (3) liquid water containing aromatics;
   (d) removing the water phase which contains aromatics from the vessel;
   (e) contacting a glyceride with the water phase of step (d) for a period of time effective to transfer aromatics from said water phase to the glyceride;
   (f) introducing the glyceride, which contains aromatics transferred from the water phase, into the pressure vessel of step (b);
   (g) supplying heat to the contents of the vessel in order to raise the temperature to between 80° to 85° F., and thereby increase the pressure to about 750 to 850 psia, to form three phases: (1) gaseous carbon dioxide plus aromatics, (2) liquid carbon dioxide plus aromatics, and (3) liquid glyceride which contains water phase aromatics;
   (h) refluxing, in a packed column, liquid carbon dioxide and gaseous carbon dioxide phases, while slowly venting thereby removing "lean" carbon dioxide from the vessel and concentrating aromatics in the glyceride, until the pressure drops to about 650 to 700 psia;
   (i) depressurizing the vessel;
   (j) obtaining an aromatized glyceride; and
   (k) combining the aromatized glyceride with soluble coffee powder.

2. Method of claim 1 wherein the contents of the pressure vessel of step (c) are heated to a temperature of about 70° F. to 85° F.

3. Method of claim 1 wherein the water phase and glyceride of step (e) are contacted at a volume ratio of 0.5:1 to 4:1 water to glyceride.

4. Method of claim 3 wherein the water and glyceride are contacted at a volume ratio of 1:1 to 1.5:1 water to glyceride.

5. Method of claim 3 wherein the water and glyceride are contacted in a batch reactor for in excess of 4 minutes.

6. Method of claim 5 wherein the water and glyceride are contacted for in excess of 8 minutes.

7. Method of claim 3 wherein the water and glyceride are contacted in a continuous reactor for in excess of 30 seconds.

8. Method of claim 3 wherein the water and glyceride are contacted at a temperature of about 35° F. to about 120° F.

9. Method of claim 1 which further comprises centrifuging the water and glyceride to separate the glyceride therefrom.

10. Method of claim 1 wherein the lean carbon dioxide is vented over a time in excess of 3 hours.

11. Method of claim 1 wherein the liquid carbon dioxide of step (h) is condensed from the gaseous phase in a partial condenser.

12. Method of claim 11 wherein the liquid carbon dioxide is condensed at a temperature of about 35° F. to about 70° F.

13. Method of claim 11 wherein said condensation is at a temperature of about 45° F. to about 60° F.

14. Method of claim 1 further comprising standarizing the aromatized glyceride of step (j) by blending with an unaromatized glyceride.

* * * * *